United States Patent Office 3,651,065
Patented Mar. 21, 1972

3,651,065
ZERO VALENT NICKEL COMPLEXES AND
PREPARATION THEREOF
Yoshiharu Yagi, Ibaraki-shi, Osaka-fu, Akira Kobayashi, Nishinomiya-shi, Hyogo-ken, and Itsuro Hirata, Takatsuki-shi, Osaka-fu, Japan, assignors to Sumitomo Chemical Co., Ltd.
No Drawing. Filed Nov. 19, 1968, Ser. No. 777,151
Claims priority, application Japan, Nov. 21, 1967, 42/75,042; Jan. 19, 1968, 43/3,178
Int. Cl. C07f 15/04
U.S. Cl. 260—270
9 Claims

ABSTRACT OF THE DISCLOSURE

A nickel complex compound represented by the formula:

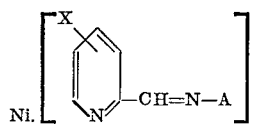

wherein X is a hydrogen atom or a non-dissociating substituent such as methyl or chlorine and A is a group of the formula:

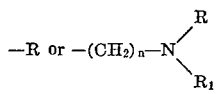

in which R and R' are each a hydrogen atom, a lower alkyl group, a cyclo(lower) alkyl group, an aryl group or an ar(lower)alkyl group and $n$ is an integer of 2 or 3, which is prepared by treating an olefin coordinated complex of zero valent nickel with a Schiff base of the formula:

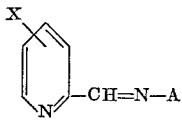

wherein X and A are each as defined above. The nickel complex is useful as a catalyst in oligomerization of butadiene and cooligomerization of the same in the presence of an α-olefin with a high selectivity.

—

The present invention relates to novel zero valent nickel catalysts and oligomerization of butadiene therewith.

In this specification, the term "pure" used in connection with a nickel complex or an olefin coordinated complex of nickel denotes the complex having one or more of ligand of identical chemical composition and not any other coordinating group such as carbonyl.

The nickel catalysts of this invention are represented by the formula:

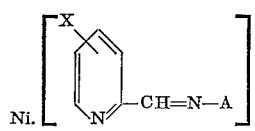

[I]

wherein X is a hydrogen atom or a non-dissociating substituent such as methyl or chlorine and A is a group of the formula:

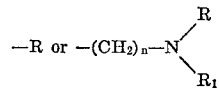

in which R and R' are each a hydrogen atom, a lower alkyl group (e.g. methyl, ethyl, propyl, butyl), a cyclo-(lower)alkyl group (e.g. cyclopentyl, cyclohexyl), an aryl group (e.g. phenyl, tolyl, naphthyl) or an ar(lower)alkyl group (e.g. benzyl, phenethyl) and $n$ is an integer of 2 or 3.

Hitherto, there have been prepared a variety of transition metal complexes useful as catalysts. As the nickel complexes suitable for such use, the following compounds are known: e.g. bis(acrylonitrile) nickel (0), bis(cyclooctadiene) nickel (0), bis(π-allyl) nickel (0), tetrakis(triarylphosphine) nickel (0), etc. All these nickel complexes known have a zero valent nickel atom as the center of the molecule. The aforesaid complex compounds are generally formed by π-electron coordination of the unsaturated carbon-carbon bond of the ligand to the central metal atom or in some cases by stabilization of the low oxidation state of the central nickel through coordination of phosphines, phosphites, arsines or stibines. Only few attempts, however, have been made for the preparation of "pure" zero valent nickel complexes with one or more of ligand having nitrogen atoms. As a matter of course, the catalytic activity of such nickel complexes has been left obscure.

A basic object of the present invention is to embody the nickel complex [I]. Another object of this invention is to embody the nickel complex [I] useful as a catalyst. A further object of the invention is to embody a process for preparing the nickel complex [I]. A still further object of the invention is to embody a method for oligomerization of butadiene and cooligomerization of the same in the presence of an α-olefin with the nickel complex [I]. These and other objects will be apparent to those conversant with the art to which the present invention pertains from the subsequent description.

According to the present invention, the nickel complex [I] is prepared by treating a "pure" olefin coordinated complex of zero valent nickel with a Schiff base of the formula:

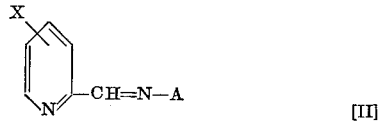

[II]

wherein X and A are each as defined above, in an inert medium.

As the "pure" olefin coordinated complex of nickel, there are exemplified bis(cyclooctadiene-1,5) nickel, cyclododecatriene nickel, tris(stilbene) nickel, bis(π-allyl) nickel, cyclooctatetraene nickel, etc.

The Schiff base [II] may be prepared by a conventional procedure, for instance, heating pyridine-2-aldehyde or its derivative with ammonia, a primary aliphatic, alicyclic or aromatic amine or an N-substituted or N,N-disubstituted ethylenediamine or trimethylenediamine in an organic solvent such as alcohol. When an unsubstituted ethylenediamine or trimethylenediamine is used, it is previously stabilized at the terminal amino group by acylation or any other suitable procedure and then reacted with pyridine-2-aldehyde or its derivative, followed by splitting off the stabilizing group to recover a free amino group. The resulting product may be purified by distillation under reduced pressure, recrystallization or any other conventional purification procedures. Specific examples of the Schiff base [II] are as follows:

| Schiff base | Starting material | |
|---|---|---|
| | Pyridine-2-aldehyde or its derivative | Amine |
| 2-pyridylmethylene aminomethane. | Pyridine-2-aldehyde | Methylamine. |
| 1-(2'-pyridylmethylene- (amino)-2-(N,N-dimethylamino) ethane. | do | N,N-dimethylethyl- enediamine. |
| 1-(2'-pyridylmethylene- amino)-2-(N,N-diethylamino)ethane. | do | N,N-diethylethyl- enediamine. |
| 1-(2'-pyridylmethylene- amino)-2-(N,N-di-n-butylamino)ethane. | do | N,N-Di-n-butyl- ethylenediamine. |
| 1-(2'-pyridylmethylene- amino)-3-(N,N-dimethylamino) propane. | do | N,N-dimethyltri- methylene- diamine. |
| 2-(4-methylpyridyl)- methyleneamino- methane. | 4-methylpyridine-2- aldehyde. | Methylamine. |
| 2-(4,6-dichloropyridyl)- methyleneamino- methane. | 4,6-dichloropyridine-2- aldehyde. | Do. |

The reaction between the "pure" olefin coordinated complex of nickel and the Schiff base [II] is carried out in an inert organic solvent such as an aliphatic ether, an aromatic ether, a cyclic ether, a saturated hydrocarbon or an aromatic hydrocarbon, preferably at a temperature from −80 to 50° C. The reaction proceeds stochiometrically so that a molecule of the ligand is combined with an atom of nickel and the coordinated olefin in the "pure" olefin complex of nickel is liberated. The reaction product is usually obtained in a form of solution when the group A of the ligand, i.e. the Schiff base [II], is represented by the formula:

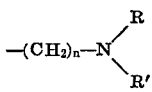

wherein R, R' and n are each as defined above, and normally in a crystalline form when the aforesaid group A of the ligand has the formula: —R wherein R is as defined above. In both cases, the recovery of the reaction product may be attained by elimination of the solvent and the liberated olefin in a conventional procedure such as filtration or distillation under reduced pressure. The resulting nickel complex [I] can be purified with facility by recrystallization or reprecipitation from a suitable, inert solvent.

The above operation for the preparation of the nickel complex [I] should be performed avoiding air and water, because both the olefin coordinated complex of nickel and the nickel complex [I] are quite sensitive to oxygen and water. Thus, the operation is practised under an anhydrous condition in an inert gas stream (e.g. nitrogen, argon).

The nickel complex [I] thus obtained is blackish violet or blackish brown solid. When contacted with air, it immediately causes pyrophillic decomposition. In the infrared absorption spectrum investigation, the absorption pattern of the nickel complex [I] is quite similar to that of the ligand itself, but the absorptions of pyridine nucleus (1560, 1580 cm.$^{-1}$) and of azomethine bond (1640 cm.$^{-1}$) are markedly shifted. This fact suggests that the absorption of pyridine nucleus is influenced by the coordination of the nitrogen atom in the nucleus and that the nitrogen atom of the side chain azomethine bond or the azomethine bond itself participates in the coordination.

The nickel complex [I] is useful as a catalyst in oligomerization of butadiene and cooligomerization of the same in the presence of any other α-olefin with a high selectivity.

For instance, treatment of butadiene in the presence of the nickel complex [I] with or without a phosphine compound of the formula: R"$_3$P wherein R" is a lower alkyl group (e.g. methyl, ethyl, propyl, buytl), a cyclo- (lower)alkyl group (e.g. cyclopentyl, cyclohexyl), an aryl group (e.g. phenyl, tolyl, naphthyl) or an ar(lower) alkyl group (e.g. benzyl, phenethyl), the benzene ring in these groups bearing or not a substituent(s), or a phosphite compound of the formula: (R"O)$_3$P wherein R" is as defined above affords industrially useful oligomers of butadiene such as 1,5-cyclooctadiene and 1,5,9-cyclododecatriene in a high selectivity. The oligomerization should be carried out under a substantially anhydrous condition and in the absence of any molecular oxygen or acidic substance. The nickel complex [I] can be applied in the isolated form and also the reaction mixture containing the said nickel complex as either a solution or a suspension at the time of its preparation can be directly applied in these reactions. The amount of the nickel complex [I] may be 0.1 to 3% by weight to butadiene. The amount of the phosphine or phosphite compound may be, if used, from 0.1 to 2 mol per one mol of the nickel complex [I]. The catalytic components and the starting butadiene are charged into a reaction vessel using or not a suitable diluent such as benzene, toluene, chlorobenzene, t-butylbenzene, pentane, heptane, n-hexane, cyclohexane, cyclooctadiene, cyclododecatriene or tetrahydrofuran. The preferred reaction temperature is between 60 and 150° C. The produced oligomers are separated by a conventional manner such as distillation.

Further, for instance, treatment of butadiene and ethylene in the presence of the nickel complex [I] yields n-decatriene in a high selectivity. The oligomerization should be effected under a substantially anhydrous condition and in the absence of any molecular oxygen or acidic substance. The amount of the nickel complex [I] may be 0.5 to 2% by weight to butadiene. The reaction is usually executed in a solvent such as benzene, toluene, chlorobenzene, tetrahydrofuran or diethyl ether at a temperature from 0 to 150° C. under a pressure from 0 to 300 kg./cm.$^2$. The reaction product can be recovered by a conventional procedure such as distillation or extraction. The obtained n-decatriene contains trans-1,4,9-decatriene as a main component, 2,4,9-decatriene and 1,3,9-decatriene, the main component being a valuable material in petro-chemical industry.

Practical and presently-preferred embodiments of the present invention are illustratively shown in the following examples. In these examples, abbreviations have conventional meanings: e.g. ml., milliliter(s); g., gram(s); ° C., degrees centigrade, etc.

PART A.—PREPARATION OF NICKEL CATALYST

Example 1

A solution of 2-pyridylmethyleneaminomethane (prepared by reacting pyridine-2-aldehyde with methylamine in ethanol in a sealed tube) (7.1 g.) in ether (50 ml.) is dropwise added to a suspension of bis(cyclooctadiene-1,5) nickel (16.2 g.) in ether (350 ml.) under argon stream, and the resultant mixture is stirred at 0° C. The reaction mixture is allowed to stand at the same temperature overnight and filtered. The collected material is washed with ether and dried in vacuo to give the nickel complex (5.2 g.) as black crystals.

*Analysis.*—Calcd. for C$_7$H$_8$N$_2$Ni (percent): C, 47.00; H, 4.51; N, 15.66; Ni, 32.81. Found (percent): C, 47.48; H, 4.72; N, 15,54; Ni, 32.8.

Example 2

Into a suspension of bis(cyclooctadiene-1,5) nickel (13.7 g.) in xylene (165 ml.) kept at 0° C., there is dropwise added a solution of 1-(2'-pyridylmethyleneamino)-2-(N,N-dimethylamino)ethane (prepared from pyridine-2-aldehyde and N,N-dimethylethylenediamine) (9.0 g.) in xylene (33 ml.), and the resultant mixture is stirred for several hours and then concentrated under 10$^{-3}$ to 10$^{-4}$ mm. Hg. The residue is admixed with xylene (30 ml.) and concentrated under reduced pressure. The resulting solid is dissolved in benzene (150 ml.) and n-hexane (1500 ml.) is added thereto. The precipitate is collected by filtration and dried in vacuo to give the nickel complex (9.6 g.) as blackish violet crystals.

Analysis.—Calcd. for $C_{10}H_{15}N_3Ni$ (percent): C, 50.90; H, 6.41; N, 17.81; Ni, 24.88. Found (percent): C, 50.37; H, 6.17; N, 16.80; Ni, 25.2.

Example 3

A solution of 1-(2'-pyridylmethyleneamino)-2-(N,N-dibutylamino)ethane (4.3 g.) in xylene (10 ml.) and a suspension of bis(cyclooctadiene-1,5) nickel (4.4 g.) in xylene (60 ml.) are combined together at 0° C. The reaction mixture is treated as in Example 2. The resulting product is dried under $10^{-4}$ mm. Hg to give the nickel complex as blackish violet viscous residue.

Analysis.—Calcd. for $C_{16}H_{27}N_3Ni$ (percent): C, 60.03; H, 8.50; N, 13.13; Ni, 18.34. Found (percent): C, 61.35; H, 8.38; N, 13.2; Ni, 17.51.

Example 4

Bis(cyclooctadiene - 1,5) nickel (1.9 g.) and 1-(2'-pyridylmethyleneamino) - 3 - (N,N-dimethylamino)propane (1.4 g.) are reacted in xylene. The reaction mixture is treated as in Example 2. The resulting product is dissolved in benzene and n-hexane is added thereto. The precipitate is collected to give the nickel complex.

Analysis.—Calcd. for $C_{11}H_{17}N_3Ni$ (percent): C, 52.85; H, 6.86; N, 16.81; Ni, 23.48. Found (percent): C, 51.98; H, 7.06; N, 17.42; Ni, 22.39.

Example 5

Into a suspension of bis(cyclooctadiene-1,5) nickel (3.9 g.) in xylene (47 ml.), there is added a solution of 1-(2'-pyridylmethyleneamino) - 2 - (N,N-diethylamino)ethane (prepared from pyridine-2-aldehyde and N,N-diethylenediamine) (2.9 g.) in xylene (10 ml.) at 0° C. in argon stream. The reaction mixture is concentrated under $10^{-3}$ to $10^{-4}$ mm. Hg. The residue is dissolved in xylene (30 ml.) and concentrated under reduced pressure. The resulting solid is dissolved in benzene (30 ml.) and n-hexane (300 ml.) is added thereto. The precipitate is collected by filtration and dried in vacuo to give the nickel complex (2.5 g.) as blackish violet crystals.

Analysis.—Calcd. for $C_{12}H_{19}N_3Ni$ (percent): C, 54.59; H, 7.26; N, 15.92; Ni, 22.23. Found (percent): C, 53.19; H, 7.04; N, 15.58; Ni, 21.9.

PART B.—OLIGOMERIZATION OF BUTADIENE

Example 1

The nickel complex (0.378 g.) prepared as in Part A, Example 1 and benzene (10 g.) are charged into a 200 ml.-volume autoclave equipped with an electromagnetic stirrer under argon stream, and butadiene (44 g.) is introduced therein. The autoclave is then heated in an oil bath at 102 to 110° C. for 6.5 hours while stirring. After cooling, the reaction mixture is fractionally distilled under reduced pressure to give the distillate (29.5 g.) and the residue (3 g.) in addition to unreacted butadiene and benzene. The distillate (29.5 g.) is subjected to gas-chromatographic analysis and confirmed to contain the following materials: 4-vinylcyclohexene, 4.9% by weight; cis,cis-1,5-cyclooctadiene, 6.7% by weight; 1,5,9-cyclododecatriene mainly consisting of trans,trans,trans-form, 87.5% by weight; others, 1.3% by weight.

Example 2

As in Example 1, the nickel complex (0.378 g.) prepared as in Part A, Example 1, tetrahydrofuran (23 g.) and butadiene (41 g.) are subjected to reaction at 102 to 105° C. for 5 hours and treated whereby the distillate (13.8 g.) and the residue (0.65 g.) are obtained. The composition of the distillate is as follows: 4-vinylcyclohexene, 8.32% by weight; cis,cis-1,5-cyclooctadiene, 7.14% by weight; 1,5,9-cyclododecatriene, 73.66% by weight; others, 10.88% by weight.

Example 3

As in Example 1, the nickel complex (0.223 g.) prepared as in Part A, Example 2, benzene (7 g.) and butadiene (39 g.) are subjected to reaction and treated whereby the distillate (29.0 g.) and the residue (1.9 g.) are obtained. The composition of the distillate is as follows: 4-vinylcyclohexene, 2.48% by weight; cis,cis-1,5-cyclooctadiene, 3.65% by weight; 1,5,9 - cyclododecatriene, 93.49% by weight; others, 0.38% by weight.

Example 4

The nickel complex (0.455 g.) prepared as in Part A, Example 1, triphenylphosphine (0.673 g.) and benzene (18 g.) are charged into a 200 ml.-volume autoclave equipped with an electromagnetic stirrer under argon stream, and butadiene (42 g.) is introduced therein. The autoclave is then heated in an oil bath at 101 to 103° C. for 7 hours while stirring. The reaction mixture is treated as in Example 1 to give the distillate (24.7 g.) and the residue (1.2 g.). The composition of the distillate is as follows: 4-vinylcyclohexene, 19.7% by weight; cis,cis-1,5-cyclooctadiene, 63.8% by weight; 1,5,9-cyclododecatriene, 16.3% by weight.

Example 5

The nickel complex (0.370 g.) prepared as in Part A, Example 2, triphenylphosphine (0.034 g.), benzene (13 g.) and butadiene (39 g.) are subjected to reaction at 100 to 104° C. for 8.5 hours as in Example 4. The reaction mixture is treated as in Example 1 to give the distillate (19.6 g.). The composition of the distillate is as follows: 4-vinylcyclohexene, 21.5% by weight; cis,cis-1,5-cyclooctadiene, 19.5% by weight; 1,5,9-cyclododecatriene, 56.5% by weight; others, 2.7% by weight.

Example 6

The nickel complex (0.277 g.) prepared as in Part A, Example 2, triphenylphosphine (0.316 g.), benzene (15 g.) and butadiene (38 g.) are subjected to reaction at 101 to 105° C. for 8.5 hours as in Example 4. The reaction mixture is treated as in Example 1 to give the distillate (13.7 g.) and the residue (2.7 g.). The composition of the distillate is as follows: 4-vinylcyclohexene, 15.6% by weight; cis,cis-1,5-cyclooctadiene, 38.9% by weight; 1,5,9-cyclododecatriene, 30.6% by weight; others, 14.9% by weight.

Example 7

The nickel complex (0.242 g.) prepared as in Part A, Example 2, triphenylphosphine (0.290 g.), tetrahydrofuran (29 g.) and butadiene (11 g.) are subjected to reaction at 100 to 104° C. for 3.5 hours as in Example 4. The reaction mixture is treated as in Example 1 to give the distillate (7.4 g.) and the residue (1.6 g.). The composition of the distillate is as follows: 4-vinylcyclohexene, 15.8% by weight; cis,cis-1,5-cyclooctadiene, 48.2% by weight; 1,5,9-cyclododecatriene, 21.2% by weight; others, 14.6% by weight.

Example 8

The nickel complex (0.251 g.) prepared as in Part A, Example 2, triphenylphosphite (0.334 g.), benzene (14 g.) and butadiene (36 g.) are subjected to reaction at 103 to 108° C. for 7.5 hours as in Example 4. The reaction mixture is treated as in Example 1 to give the distillate (20.3 g.) and the residue (1.9 g.). The composition of the distillate is as follows: 4-vinylcyclohexene, 10.2% by weight; cis,cis-1,5-cyclooctadiene, 85.2% by weight; 1,5,9-cyclododecatriene, 4.4% by weight; others, 0.3% by weight.

Example 9

The nickel complex (0.221 g.) prepared as in Part A, Example 3, triphenylphosphine (0.223 g.), benzene (18 g.) and butadiene (33 g.) are subjected to reaction at 103 to 108° C. for 6 hours as in Example 4. The reaction mixture is treated as in Example 1 to give the distillate (13.5 g.) and the residue (0.9 g.). The composition of the distillate is as follows: 4-vinylcyclohexene, 10.6% by weight; cis,cis-1,5-cyclooctadiene, 78.5% by weight; 1,5,9-cyclododecatriene, 6.4% by weight; others 4.4% by weight.

PART C.—COOLIGOMERIZATION OF BUTADIENE WITH ETHYLENE

Example 1

A catalytic amount of the nickel complex prepared as in Part A, Example 2 and a designed amount of benzene are charged into a 200 ml.-volume autoclave equipped with an electromagnetic stirrer under argon stream, and a designed amount of butadiene is introduced therein. After introduction of ethylene, the autoclave is heated in an oil bath. The reaction mixture is subjected to gas-chromatographic analysis. The results are shown in the following table:

TABLE

| No. | Nickel complex (g.) | Butadiene (g.) | Ethylene (g.) | Molar ratio of ethylene/butadiene | Benzene (g.) | Reaction temperature (° C.) | Duration of reaction (hour) | Conversion percent | Products (percent by weight) | | | |
|---|---|---|---|---|---|---|---|---|---|---|---|---|
| | | | | | | | | | A | B | C | Others |
| 1 | 0.68 | 21 | 27 | 2.5 | 17 | 80 | 24.75 | 15 | 63 | ---- | 9 | 28 |
| 2 | 0.75 | 20 | 20 | 1.9 | 20 | 80 | 24.00 | 48 | 53 | 10 | 9 | 28 |
| 3 | 0.63 | 22 | 12 | 1.1 | 18 | 80 | 24.51 | 49 | 53 | 7 | 16 | 24 |
| 4 | 0.23 | 24 | 56 | 4.5 | 29 | 100 | 25.00 | 38 | 74 | 8 | ---- | 17 |
| 5 | 0.25 | 20 | 21 | 2.0 | 30 | 100 | 8.00 | 100 | 38 | 29 | 16 | 17 |

NOTE.—A, trans-1,4,9-decatriene (B.P. 85 to 86° C./60 mm. Hg). B, 1,3,9-decatriene and 2,4,9-decatriene mixture. C, cyclododecatriene.

Example 2

The nickel complex (0.57 g.) prepared as in Part A, Example 1 and benzene (35 g.) are charged in an autoclave, and butadiene (21 g.) and ethylene (28 g.) are introduced therein. The reaction is effected at 100° C. for 25 hours. The reaction mixture is subjected to gas-chromatographic analysis. The production of oligomers (2.4 g.) containing trans-1,4,9-decatriene (1 g.) is confirmed.

What is claimed is:

1. A complex of the formula:

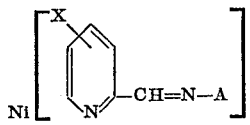

wherein X is a hydrogen atom, chloro or methyl and A is a group of the formula:

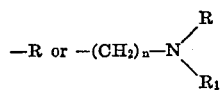

in which R and R' are each hydrogen, methyl, ethyl, propyl, butyl, cyclopentyl, cyclohexyl, phenyl, tolyl, naphthyl, benzyl or phenethyl, and $n$ is an integer of 2 or 3.

2. A complex of a molecule of 2-pyridylmethyleneaminomethane and an atom of nickel.

3. A complex of a molecule of 1-(2'-pyridylmethyleneamino)-2-(N,N-dimethylamino)ethane and an atom of nickel.

4. A complex of a molecule of 1-(2'-pyridylmethyleneamino)-2-(N,N-dibutylamino)ethane and an atom of nickel.

5. A complex of a molecule of 1-(2'-pyridylmethyleneamino)-3-(N,N-dimethylamino)propane and an atom of nickel.

6. A complex of a molecule of 1-(2'-pyridylmethyleneamino)-2-(N,N-diethylamino)ethane and an atom of nickel.

7. A process for preparing a complex of the formula:

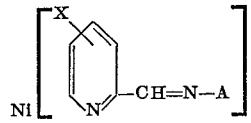

wherein X is a hydrogen atom, chloro or methyl and A is a group of the formula:

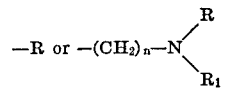

in which R and R' are each hydrogen, methyl, ethyl, propyl, butyl, cyclopentyl, cyclohexyl, phenyl, tolyl, naphthyl, benzyl or phenethyl, and $n$ is an integer of 2 or 3, which comprises treating, in the absence of oxygen and water, a complex of zero valent nickel coordinated with an olefinic hydrocarbon, with a Schiff base of the formula:

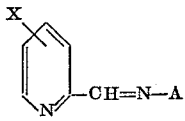

wherein X and A are each as defined above.

8. The process according to claim 7, wherein the reaction is carried out in an inert organic solvent.

9. The process according to claim 7, wherein the reaction is carried out at a temperature from −80 to 50° C.

References Cited

FOREIGN PATENTS 1,047,418  11/1966  Great Britain _____ 260—270

ALEX MAZEL, Primary Examiner

J. H. TURNIPSEED, Assistant Examiner

U.S. Cl. X.R.

252—438, 472; 260—240, 666, 677